United States Patent
Cha et al.

(10) Patent No.: US 10,239,348 B2
(45) Date of Patent: Mar. 26, 2019

(54) VARIABLE WIDTH WHEEL ASSEMBLY

(71) Applicant: HANKOOK TIRE CO., LTD., Seoul (KR)

(72) Inventors: Yong Ho Cha, Daejeon (KR); Seung Koo Kang, Seoul (KR); Yoon-Jin Choi, Daejeon (KR); Choong-Kee Song, Daejeon (KR)

(73) Assignee: HANKOOK TIRE CO., LTD., Seoul (KR)

( * ) Notice: Subject to any disclaimer, the term of this patent is extended or adjusted under 35 U.S.C. 154(b) by 300 days.

(21) Appl. No.: 14/984,818

(22) Filed: Dec. 30, 2015

(65) Prior Publication Data

US 2016/0200139 A1 Jul. 14, 2016

(30) Foreign Application Priority Data

Jan. 14, 2015 (KR) .................. 10-2015-0006952

(51) Int. Cl.
*B60B 23/12* (2006.01)
*B60B 25/00* (2006.01)
(Continued)

(52) U.S. Cl.
CPC .............. *B60B 23/12* (2013.01); *B60B 19/02* (2013.01); *B60B 19/04* (2013.01); *B60B 21/02* (2013.01);
(Continued)

(58) Field of Classification Search
CPC ......... B60B 15/00; B60B 15/02; B60B 15/04; B60B 15/10; B60B 15/12; B60B 15/14; B60B 15/16; B60B 25/00; B60B 25/002; B60B 25/006; B60B 23/00; B60B 23/04; B60B 23/10; B60B 23/12
See application file for complete search history.

(56) References Cited

U.S. PATENT DOCUMENTS 1,122,875 A * 12/1914 Doty et al. ................ B60C 7/10
152/325
2,733,963 A * 2/1956 Allard ................... B60B 15/263
301/41.1
(Continued)

FOREIGN PATENT DOCUMENTS

DE 3800857 A1 10/1989
ES 2263404 A1 12/2006
(Continued)

OTHER PUBLICATIONS

Partial European Search Report issued in European Patent Application No. 152028452.-1760 dated Jun. 14, 2016.
(Continued)

*Primary Examiner* — Jason R Bellinger
(74) *Attorney, Agent, or Firm* — Marshall, Gerstein & Borun LLP

(57) ABSTRACT

Provided is a tire including rims, beads each mounted so as to surround each of the rims, a side wall that is connected to the beads, a sub-tread that is formed on top of the side wall and is formed of a material having elasticity so as to have a changing curvature, and plural tread blocks that are arranged on the sub-tread such that the distances between the tread blocks change in accordance with the change in the curvature of the sub-tread.

6 Claims, 7 Drawing Sheets

(51) Int. Cl.
*B60C 11/00* (2006.01)
*B60C 11/03* (2006.01)
*B60C 11/11* (2006.01)
*B60C 15/02* (2006.01)
*B60B 19/02* (2006.01)
*B60B 19/04* (2006.01)
*B60B 21/02* (2006.01)
*B60C 3/00* (2006.01)

(52) U.S. Cl.
CPC .......... *B60B 25/00* (2013.01); *B60B 25/002* (2013.01); *B60C 3/00* (2013.01); *B60C 11/0008* (2013.01); *B60C 11/0041* (2013.01); *B60C 11/0083* (2013.01); *B60C 11/0306* (2013.01); *B60C 11/11* (2013.01); *B60C 15/02* (2013.01); *B60C 2011/0016* (2013.01); *B60C 2011/0025* (2013.01)

(56) References Cited

U.S. PATENT DOCUMENTS

| | | | | |
|---|---|---|---|---|
| 2,751,959 A | * | 6/1956 | Blomquist | B60B 11/00 152/158 |
| 3,517,721 A | * | 6/1970 | Woodhall | B60C 3/00 152/454 |
| 3,805,865 A | * | 4/1974 | Price | B60C 11/032 152/209.15 |
| 4,773,889 A | * | 9/1988 | Rosenwinkel | A63H 17/262 152/454 |
| 6,022,082 A | * | 2/2000 | O'Brien | B60B 15/263 152/216 |
| 8,863,796 B2 | * | 10/2014 | Nakamizo | B60C 11/0306 152/209.18 |
| 2005/0028914 A1 | | 2/2005 | Hill et al. | |
| 2006/0219368 A1 | * | 10/2006 | Hirata | B60B 25/00 157/1.35 |
| 2007/0137749 A1 | * | 6/2007 | Mathews | B60C 11/11 152/209.15 |

FOREIGN PATENT DOCUMENTS

| | | |
|---|---|---|
| GB | 1290857 A | 9/1972 |
| JP | S58-164408 A | 9/1983 |
| JP | S61-109801 A | 5/1986 |
| JP | H05-131802 A | 5/1993 |
| JP | 2007-106390 A | 4/2007 |
| JP | 2007-203802 A | 8/2007 |
| JP | 2013-216208 A | 10/2013 |
| KR | 1999-0041143 | 6/1999 |
| KR | 2013-0042144 A | 4/2013 |
| KR | 10-1347172 B1 | 1/2014 |

OTHER PUBLICATIONS

Extended European Search Report issued in European Patent Application No. 15202845.2-1760 dated Nov. 9, 2016.

* cited by examiner

VARIABLE WIDTH WHEEL ASSEMBLY

CROSS-REFERENCE TO RELATED APPLICATIONS

This U.S. utility patent application claims the benefit of priority under 35 U.S.C. § 119 of Korean Patent Application No. 10-2015-0006952, filed Jan. 14, 2015, the entire contents of which are hereby incorporated herein by reference for all purposes.

TECHNOLOGICAL FIELD

The present disclosure relates to a tire, and more particularly, to a tire which can be used not only in a normal road environment, but also in various environments such as an off-road environment.

BACKGROUND

Tires have treads with various shapes in order to satisfy the various performances required for the purpose of driving vehicles. The design of such a tread pattern greatly affects the driving power and the braking power of the vehicle, as well as the comfort of riding, noises, and drainage capability.

For example, an on-road tire for sports driving is designed to have a shape that can secure a ground contact area as large as possible, and an off-road tire is designed to have a block type shape that can increase traction. Furthermore, a snow tire uses a uniquely shaped kerf design for the maximization of snow performance (see Korean Registered Patent No. 1347172).

Also, in recent years, attempts have been made to develop a tire having multiple characteristics, which can be used in various environments.

SUMMARY OF THE DISCLOSURE

An object of the present disclosure is to provide a tire which is equally applicable to various road environments such as an on-road environment and an off-road environment.

In order to achieve the object described above, a tire according to an aspect of the present disclosure includes rims; beads mounted so as to surround each of the rims; a side wall that is connected to the beads; a sub-tread that is formed on top of the side wall and is formed of an elastic material so as to have a changing curvature; and plural tread blocks that are arranged on the sub-tread such that the distances between the tread blocks can change in accordance with the change in curvature of the sub-tread.

The sub-tread may have the curvature changed in accordance with the change in the internal pressure of the tire, and the rim may have a variable width so that the volume of the tire can change.

The rim includes a first side and a second side that are disposed on respective sides of the cylinder constituting the rim, and the tire may further include a rim width-regulating apparatus that is disposed between the first side and the second side and is operated to regulate the width of the rims.

The rim width-regulating apparatus may be composed of a mechanical apparatus including a spring, or a hydraulic system.

The rim may include a first width intended to realize an on-road mode in which the distances between the plural tread blocks are minimized; and a second width which is smaller than the first width and is intended to realize an off-road mode in which the distances between the plural tread blocks are maximized.

In the on-road mode, the tire has a first diameter, and in the off-road mode, the tire has a second diameter that is larger than the first diameter, while the dimension of the second diameter may be no more than 1.4 times the dimension of the first diameter.

Furthermore, the tire may have an internal pressure of 1.5 to 2.8 Bar in the on-road mode, and may have an internal pressure of 2.8 to 3.6 Bar in the off-road mode.

The tread blocks may have a hexagonal prism shape, and in the on-road mode, the tread blocks may be arranged such that a tread block is in contact with four tread blocks among the six adjacent tread blocks that surround the relevant tread block, and is separated from two other tread blocks at a predetermined distance, while in the off-road mode, the tread blocks may be arranged such that a tread block is separated from all of the six adjacent tread blocks that surround the relevant tread block, at a predetermined distance.

The sub-tread may be formed from a composition having physical properties such as a hardness of 80 to 90, a 300% modulus of 110 to 125 $kgf/cm^2$, an elongation of 600% or more, and a tensile strength of 125 $kgf/cm^2$ or more.

The presently disclosed embodiments can provide a tire which is applicable to all of a normal road environment and an off-road environment such as desert or mud.

The tire according to the presently disclosed embodiments has an effect that in the on-road mode, the ground contact area of the tire increases, the ride height of the vehicle is decreased, and the high speed driving stability is increased.

The tire according to the presently disclosed embodiments has an effect that in the off-road mode, the traction and braking performances are enhanced, the ride height is increased, and damage in the lower part of the vehicle can be prevented.

DETAILED DESCRIPTION

Advantages and features of the presently disclosed embodiments, and methods for achieving those will be made clear when reference is made to embodiments described below in detail together with the attached drawings. However, the present disclosure is not intended to be limited to the embodiments described herein and may be embodied in other forms. Rather, the embodiments described herein are provided so that the disclosed matters can be made perfect, and the idea of the present disclosure can be sufficiently conveyed to those ordinarily skilled in the art.

The terms used in the present specification are used simply for the purpose of explaining particular Examples and are not intended to be limiting. Unless particularly stated otherwise, an expression of singularity is meant to include an expression of plurality. It should be construed that terms such as "include (including)" or "have (having)" as used in the present specification are used to define the existence of features, numbers, stages, operations, constituent elements, parts, or combinations thereof as described in the specification, and are not intended to exclude in advance the possibility of the existence or addition of one or more other features, numbers, stages, operations, constituent elements, parts, or combinations thereof.

Unless defined otherwise, all of the terms used herein including technical or scientific terms have the same meanings as the terms that are generally understood by those having ordinary skill in the art to which the present disclosure pertains. It should be construed that terms such as those defined in dictionaries that are generally used have meanings coincident with the contextual meanings of the related art, and unless clearly defined in the present specification, the terms should not be construed to have ideal meanings or excessively formal meanings.

Hereinafter, Examples of the tire according to an exemplary embodiment are described in detail with reference to the attached drawings.

Figure 1:
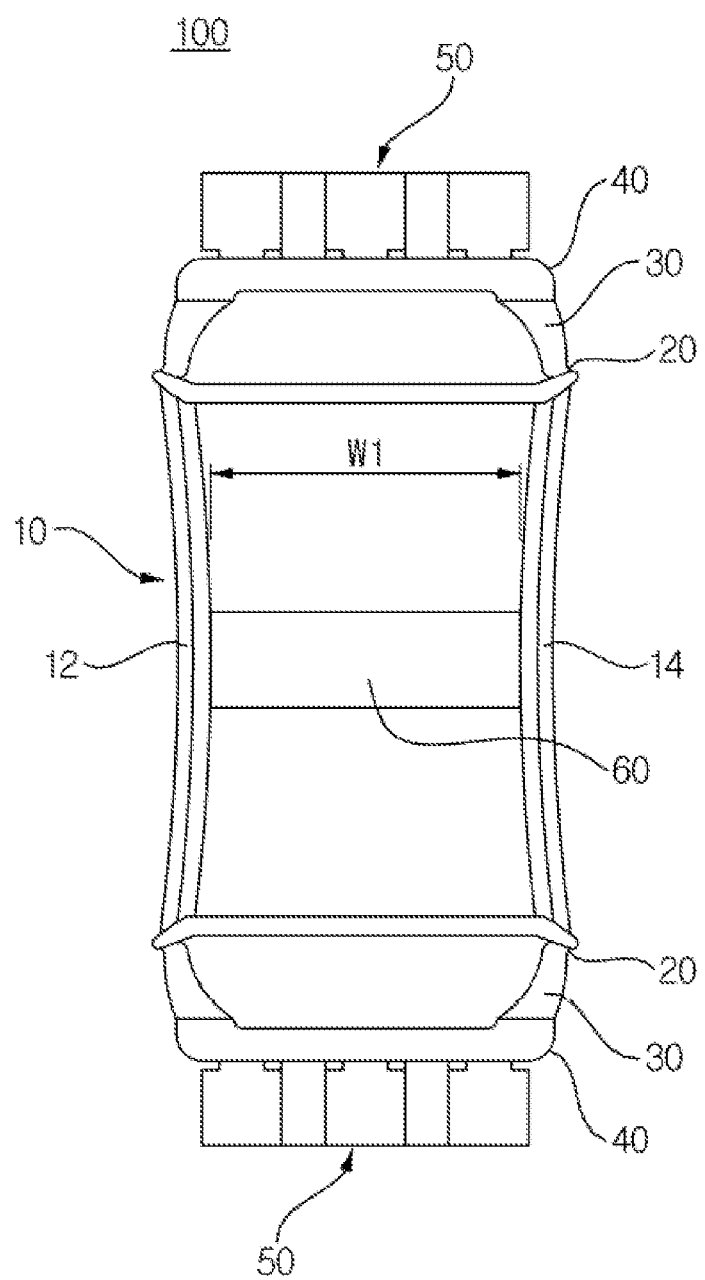
FIG. 1 is a cross-sectional view of a tire according to the presently disclosed embodiments.
Figure 2:
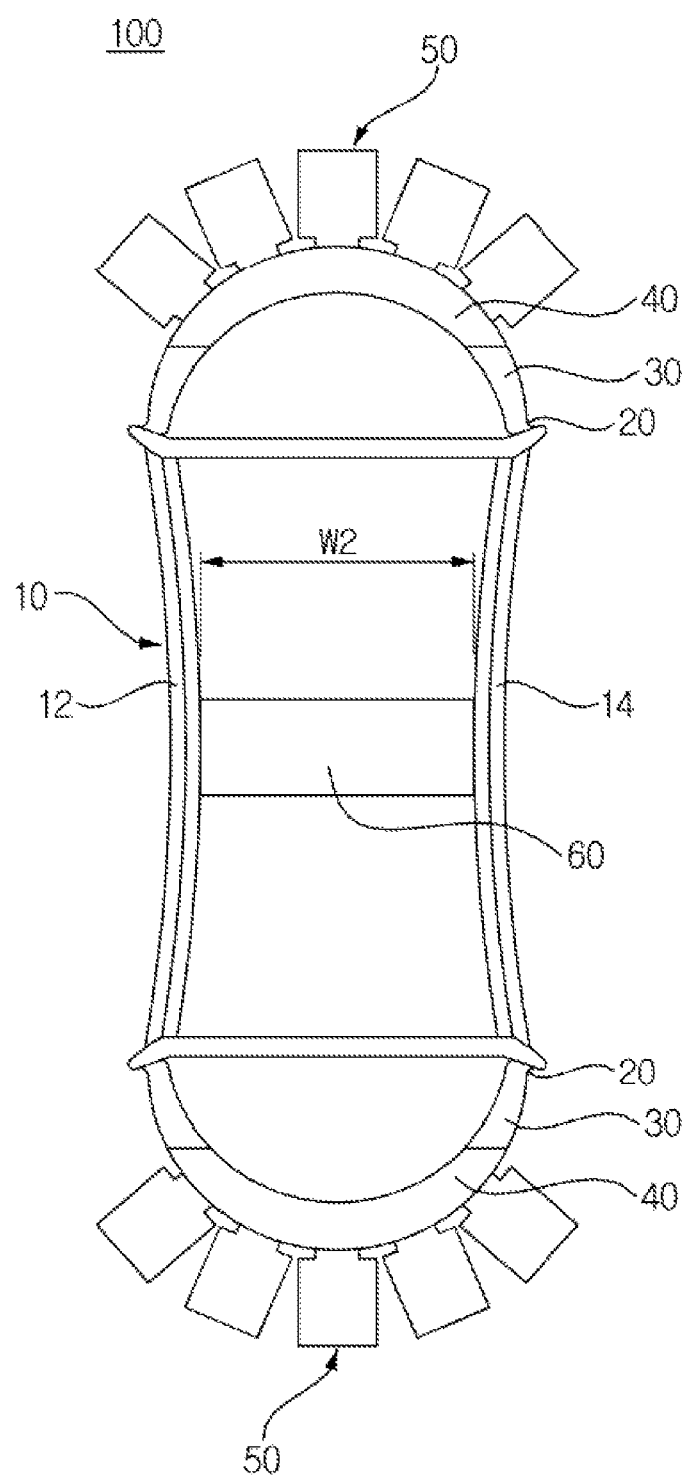
FIG. 2 is another cross-sectional view of the tire according to the presently disclosed embodiments.

FIG. 1 and FIG. 2 are cross-sectional views illustrating a tire (100) according to an embodiment, and respectively show the configurations in the on-road mode and the off-road mode. The tire (100) according to the embodiment is configured to enable the realization of the on-road mode that is intended for sports driving and the off-road mode that can exhibit optimal performance under desert conditions or muddy conditions. The tire according to the present embodiment may be a pneumatic tire.

As illustrated in FIG. 1 and FIG. 2, the tire (100) according to the embodiment includes rims (10), beads (20), a side wall (30), a sub-tread (40), and plural tread blocks (50).

A bead (20) is a part mounted so as to surround a rim (10), and the side wall (30) is connected to the beads (20) and constitutes the lateral surface of the tire (100).

The sub-tread (40) is formed on top of the side wall (30), and is formed of a material having elasticity so that the curvature may change. In the present embodiment, the sub-tread (40) is configured such that the curvature of the sub-tread changes in accordance with the change in the rim width and the subsequent change in the internal pressure of the tire (100). It is preferable that a composition having high elasticity is applied to the sub-tread (40) so that the surface area of the tire (100) can increase as the internal pressure of the tire increases. The composition for the sub-tread (40) is preferably configured such that fatigue and stress under outdoor conditions are minimized, and it is particularly preferable that the composition be configured to have characteristics such as resistance to thermal aging and excellent heat resistance under the conditions for use at a high temperature.

In order for the sub-tread (40) to satisfy conditions such as described above, the sub-tread (40) may be formed from, for example, a rubber composition having physical properties such as a hardness of 80 to 90, a 300% modulus of 110 to 125 kgf/cm$^2$, an elongation of 600% or more, and a tensile strength of 125 kgf/cm$^2$ or more.

The tread blocks (50) are parts that are brought into contact with the surface of the road, and are arranged on the sub-tread (40) such that the distances between one another may change in accordance with the change in curvature of the sub-tread (40). As illustrated in FIG. 1, in the on-road mode, the tread blocks (50) are arranged so as to be brought closer to adjacent tread blocks (50). The tread blocks (50) may be formed from a captread rubber composition so that the tire (100) may exhibit its intrinsic characteristics.

According to the international common standards, tires of particular sizes are limited to have rim widths of particular sizes. However, the tire (100) according to the embodiment has rims (10) having variable rim width, and the tire is allowed to have a tire (100) tread shape that is optimal for the use conditions by changing the pattern shape of the tire in accordance with the change in the rim width.

A rim (10) according to the present embodiment includes a first side (12) and a second side (14) that are disposed on respective sides of the cylinder constituting the rim (10), and the tire (100) further includes a rim width-regulating apparatus (60) that is disposed between the first side (12) and the second side (14) of the rim (10) and is operated to regulate the rim widths (W1, W2). The rim width-regulating apparatus (60) may be composed of a mechanical apparatus including a spring, or a hydraulic system, and a detailed example of the rim width-regulating apparatus will be described below.

As illustrated in FIG. 1, the rim (10) has a first width (W1) for realizing an on-road mode in which the distances between plural tread blocks (50) are minimized, and as illustrated in FIG. 2, the width of the rim is regulated so as to have a second width (W2) that is smaller than the first width (W1) and is intended to realize an off-road mode in which the distances between the tread blocks (50) are maximized.

At this time, as illustrated in FIG. 1, in the case in which the rim (10) has a first width (W1), the sub-tread (40) has a shape of a flat layer with an almost zero curvature, and the tread blocks (50) arranged on the sub-tread (40) are in a state of being brought closely together or the distances are minimized. Accordingly, in the on-road mode, the tire (100) may have an increased ground contact area, increased block rigidity, and enhanced high speed driving stability. Furthermore, since the section height (SH) decreases, the center of gravity of the vehicle is lowered, and the cornering performance can be enhanced.

On the other hand, as illustrated in FIG. 2, when the rim width is decreased to a second width (W2), the internal volume of the tire (100) is decreased, and the internal pressure is increased according to Boyle's Law, which is related to the volume and the pressure. Due to an increase in the internal pressure, the sub-tread (40) expands and acquires a round shape having a certain curvature. Accordingly, the distances between the various tread blocks (50) arranged on the sub-tread (40) are increased, and grooves are formed on the surface of the tire (100) by the distances generated between the tread blocks (50). Due to the grooves formed as such, the tire (100) undergoes a change in the shape to a shape that is suitable for an off-road environment or a muddy environment.

Such an open block shape pattern enhances the traction and braking performances by increasing the kicking or resistance caused by the patterned blocks in an off-road mode. Furthermore, the SH value of the tire (100) increases, and the ride height of the vehicle is increased. Thereby, an effect of preventing damage in the lower part of the vehicle under off-road conditions can also be obtained.

In the following, the characteristics exhibited by the tire according to the present embodiment in various modes will be explained in detail with reference to FIG. 3 to FIG. 6.

Figure 3:
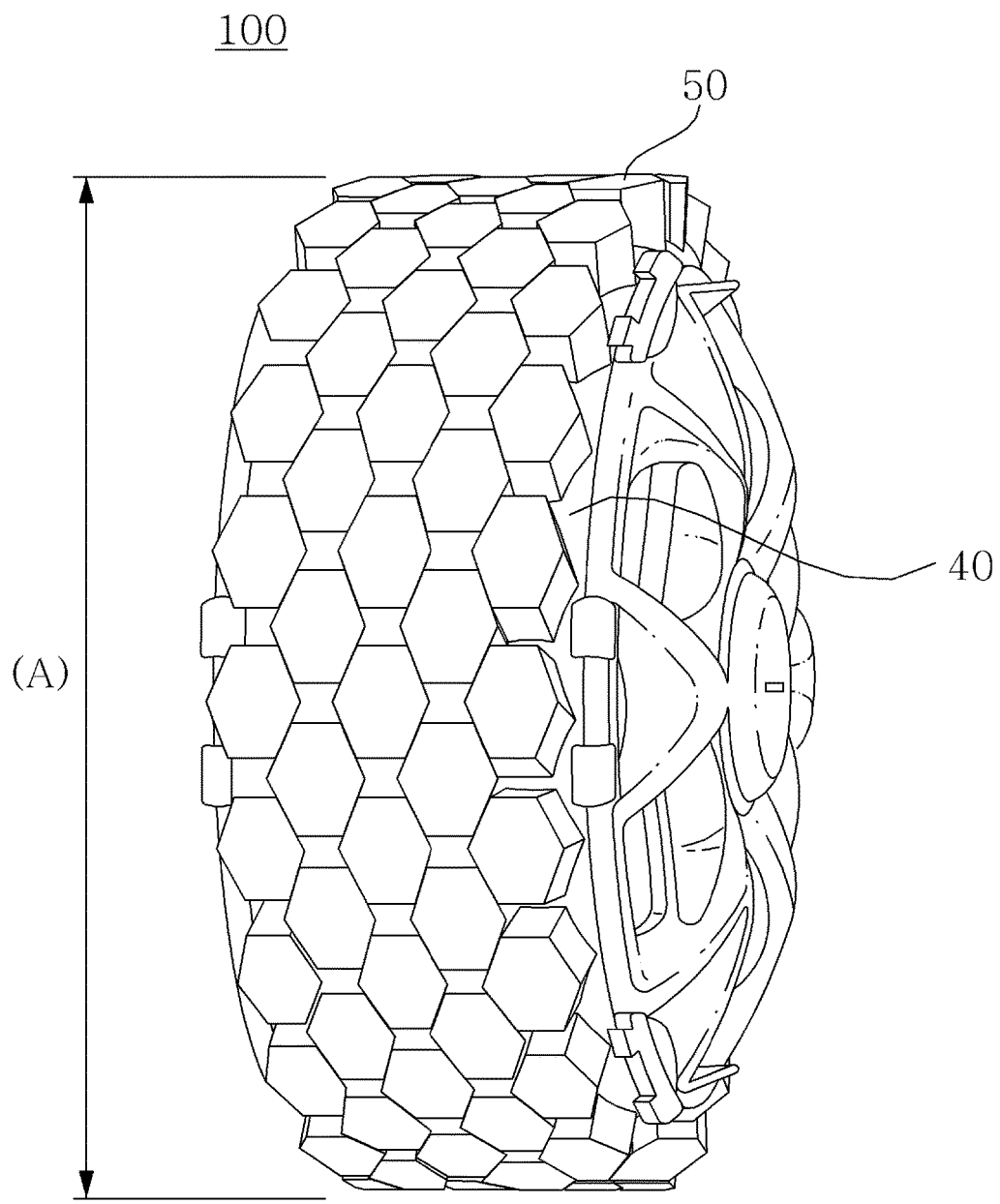
FIG. 3 is a perspective view of the tire according to the presently disclosed embodiments.
Figure 4:
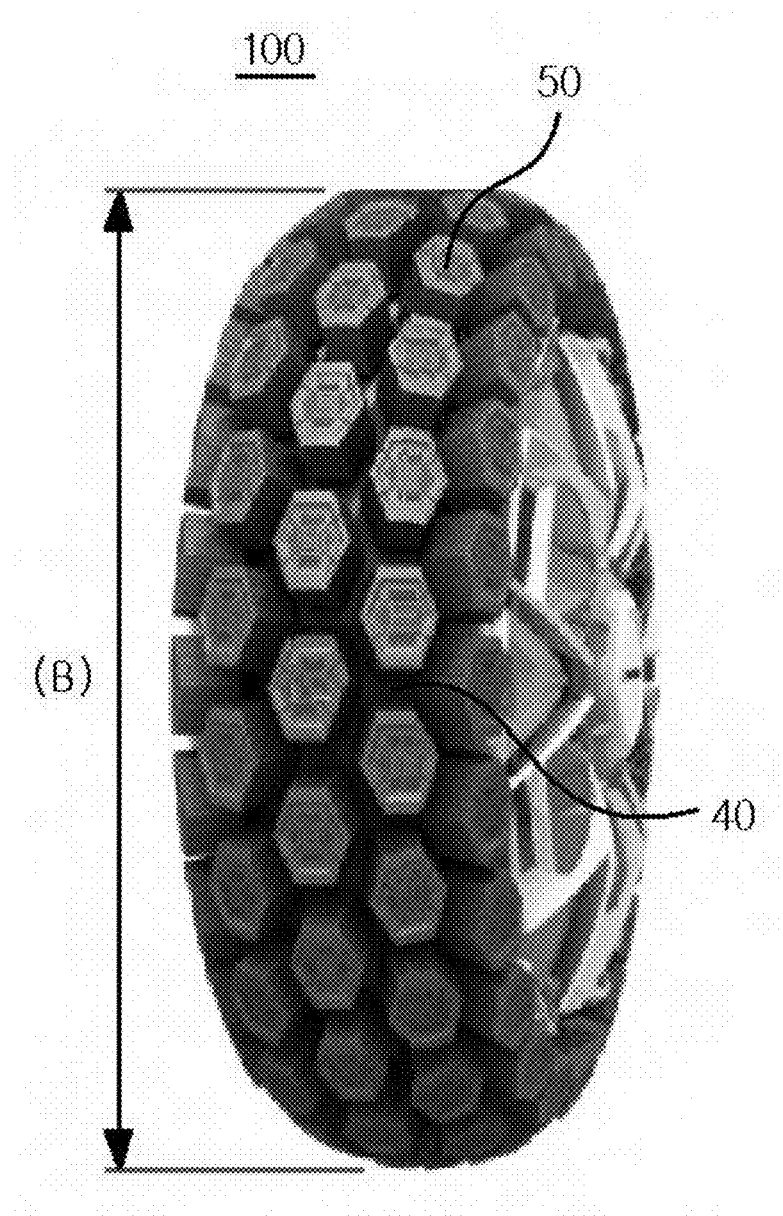
FIG. 4 is another perspective view of the tire according to the presently disclosed embodiments.

FIG. 3 and FIG. 4 are perspective views illustrating the respective shapes of the tire in the on-road mode and the off-road mode. As discussed above, when the rim width is decreased, the sub-tread that has a flat shape in the on-road mode acquires a round shape having a curvature, and in the off-road mode, the tire has a larger diameter than the diameter obtainable in the on-road mode.

As illustrated in FIG. 3, the tire has a first diameter [A] in the on-road mode, and as illustrated in FIG. 4, the tire has a second diameter [B] that is larger than the first diameter [A] in the off-road mode. At this time, when the problem of driving stability caused by an excessive change in the ride height, and the preferred elongation and the like of the sub-tread material are considered, it is preferable that the dimension of the second diameter [B] is no more than 1.4 times the dimension of the first diameter [A].

Furthermore, the tire according to the embodiment may have an internal pressure of 1.5 to 2.8 Bar in the on-road mode, and may have an internal pressure of 2.8 to 3.6 Bar in the off-road mode. As a result of such an increase in pressure, the sub-tread can be changed to a shape having a curvature in the off-road mode.

Figure 5:
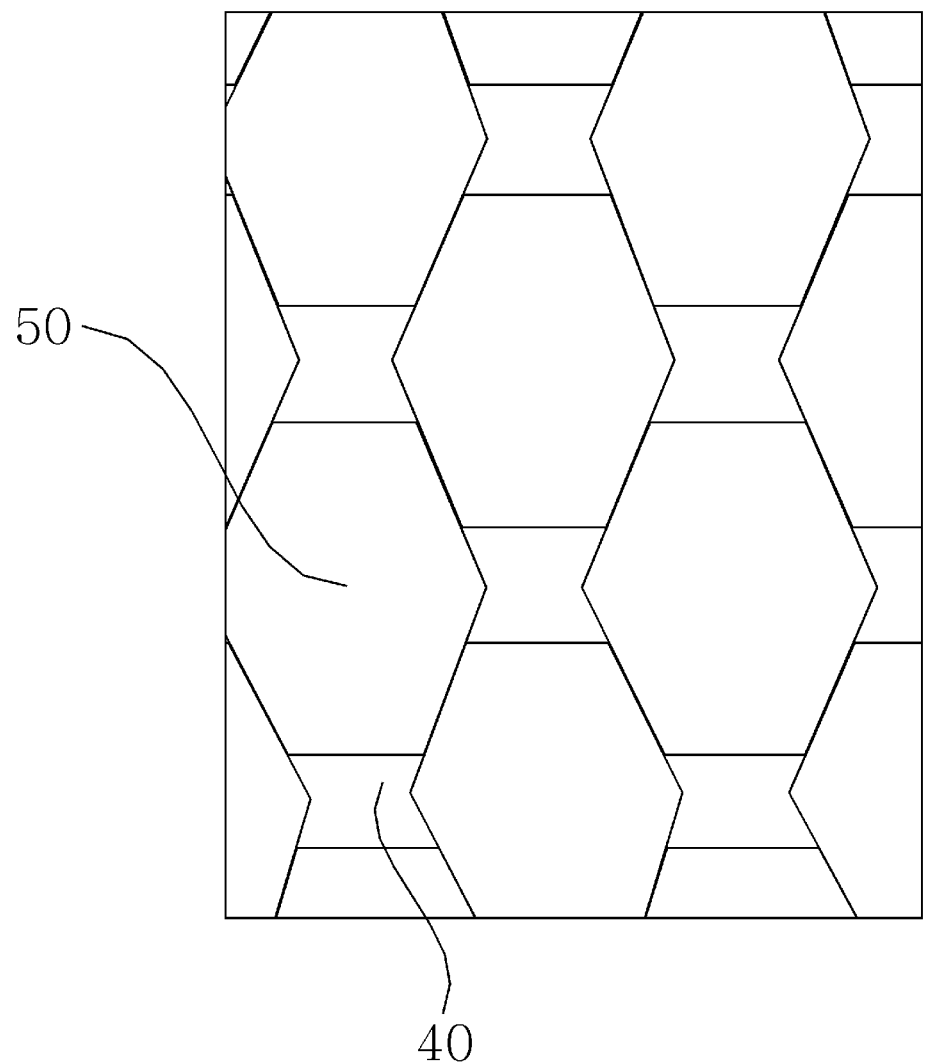
FIG. 5 is a magnified perspective view of the tread blocks of FIG. 3.
Figure 6:
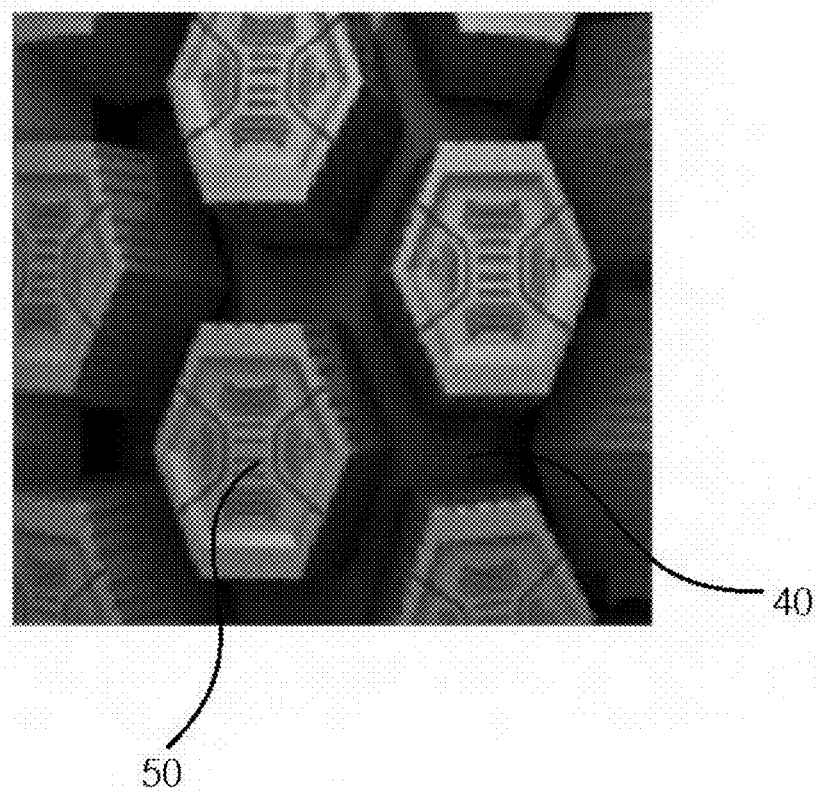
FIG. 6 is a magnified perspective view of the tread blocks of FIG. 4.

FIG. 5 and FIG. 6 show the tread blocks in the on-road mode and the off-road mode, respectively. According to the present embodiment, the tread blocks may be configured to have a hexagonal prism shape. As the tread blocks have hexagonal cross-sections, one tread block is surrounded by six adjacent tread blocks. At this time, as illustrated in FIG. 5, in the on-road mode, the tread blocks are arranged such that one tread block is in contact with four tread blocks among the six tread blocks that surround the relevant one tread block, and the relevant one tread block is separated by a predetermined distance from the remaining two tread blocks that are disposed to face each other. According to such an arrangement, the grip force of the tire can be increased in the on-road mode.

Furthermore, as illustrated in FIG. 6, in the off-road mode, the tread blocks are arranged such that one tread block is separated by a predetermined distance from all of the six adjacent tread blocks that surround the relevant tread block, and due to the distance, grooves suitable for the off-road mode can be formed.

However, the present disclosure is not intended to be limited to the shapes of the tread blocks described above, and the shape and arrangement of the tread blocks can be embodied in various shapes according to the required application and purpose.

Figure 7:
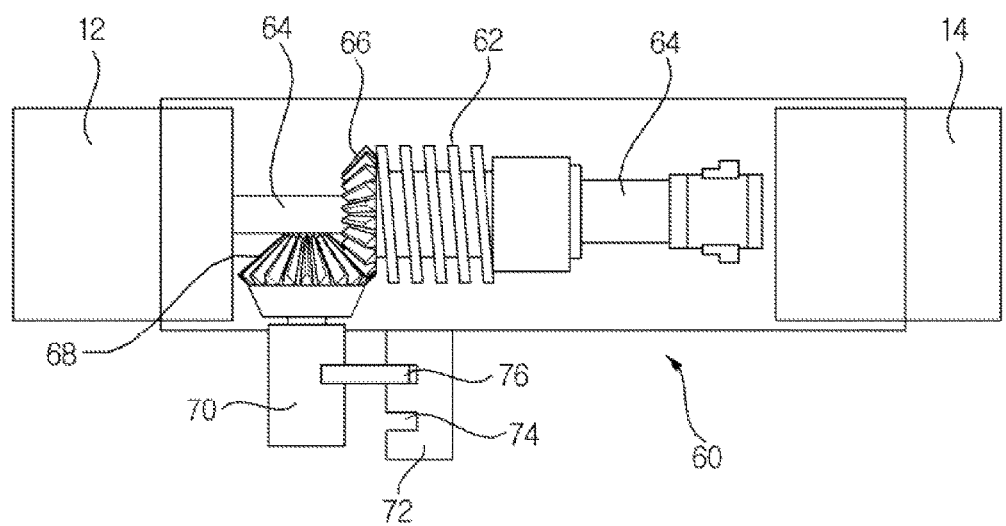
FIG. 7 is a lateral view illustrating the rim width-regulating apparatuses of FIG. 1 and FIG. 2.

FIG. 7 illustrates a rim width-regulating apparatus, and the rim width-regulating apparatus (60) according to the present embodiment is configured as a mechanical apparatus including a spring (62). In the following, the configuration of the rim width-regulating apparatus (60) will be explained in detail with reference to FIG. 7.

A spring damper (64) elastically supported with the spring (62) is connected between the first side (12) and the second side (14) of the rim. The spring damper (64) is provided with a driven bevel gear (66), and the driven bevel gear (66) is engaged with a driving bevel gear (68). The shaft of the driving bevel gear (68) is configured to be engaged with a screw rotating shaft (70) by a screw tightening system. Accordingly, the rim width-regulating apparatus is configured such that the driven bevel gear (66) engaged with the driving bevel gear (68) is driven by the rotation of the screw rotating shaft (70), and drives the spring damper (64) so as to adjust the length between the first side (12) and the second side (14) of the rim (10). Furthermore, a stopper pin (76) of the screw rotating shaft (70) is fixed to a support (72) that is fixed to the rim in such a manner that the stopper pin is selectively fitted to interval grooves (74) of the support (72). Thus, the rim width is adjusted to a predetermined value, and then the rim width is fixed.

In regard to a rim width-regulating apparatus (60) having a configuration such as described above, a method for regulating the rim width more accurately than a method of using a screw can be employed according to the disclosure of Korean Registered Patent No. 1347172, which has been mentioned above as a reference literature for the present specification. However, the presently disclosed embodiments are not intended to be limited to a rim width-regulating apparatus having such a structure, and as described above, the regulation of the rim width can also be achieved through a hydraulic system or an electrically controlled system.

The tire according to the embodiment described above can be applied to both an on-road mode and an off-road mode. Therefore, a tire having optimal performance can be provided to consumers, and since there is no need to exchange the tire every time when the road environment changes, the economic efficiency can also be increased.

An exemplary embodiment has been explained with reference to the attached drawings; however, it should be understood that any person having ordinary skill in the art to which the present disclosure pertains can carry out the presently disclosed embodiments in other specific manners without modifying the technical idea or essential features thereof. Therefore, it should be construed that the embodiments described above are only for illustrative purposes in all aspects and are not intended to be limiting.

What is claimed is:

1. A wheel assembly comprising:
a rim and a tire,
wherein the rim has a variable width that enables a change in the volume of the tire, and
wherein the tire comprises:
a bead mounted so as to surround the rim;
a side wall connected to the bead;
a sub-tread formed on top of the side wall and made of a material having elasticity so as to have a curvature adapted to change in accordance with the change in the internal pressure of the tire; and
plural tread blocks arranged on the sub-tread such that the distances between the tread blocks are adapted to change in accordance with the change in the curvature of the sub-tread, and wherein:
the tire has a first diameter in an on-road mode in which the sub-tread has a planar shape, and has a second diameter that is larger than the first diameter in an off-road mode in which the sub-tread has a round shape having the curvature,
the rim has a first width defining the on-road mode in which the distances between the plural tread blocks are minimized and a second width that is smaller than the first width and defines the off-road mode in which the distances between the plural tread blocks are maximized,
the plural tread blocks have a hexagonal prism shape and one tread block is surrounded by six adjacent tread blocks,
in the on-road mode, the one tread block is in contact with four tread blocks among the six adjacent tread blocks that surround the one tread block, and is separated at a predetermined distance from the other two tread blocks, and in the off-road mode, the one tread block is separated at a predetermined distance from all of the six adjacent tread blocks that surround the one tread block.

2. The wheel assembly according to claim 1, wherein:
the rim includes a first side and a second side disposed on respective sides of a cylinder that forms the rim, and
the wheel assembly further comprises a rim width-regulating apparatus that is disposed between the first side and the second side and is operated to regulate the width of the rim.

3. The wheel assembly according to claim 2, wherein the rim width-regulating apparatus is composed of a mechanical apparatus including a spring.

4. The wheel assembly according to claim 1, wherein the dimension of the second diameter is no more than 1.4 times the dimension of the first diameter.

5. The wheel assembly according to claim 1, wherein the tire has an internal pressure of 1.5 to 2.8 Bar in the on-road mode, and has an internal pressure of 2.8 to 3.6 Bar in the off-road mode.

6. The wheel assembly according to claim 1, wherein the sub-tread is formed from a composition having physical properties including a hardness of 80 to 90, a 300% modulus of 110 to 125 $kgf/cm^2$, an elongation of 600% or more, and a tensile strength of 125 $kgf/cm^2$ or more.

* * * * *